J. L. YOUNG.
DENTAL APPLIANCE.
APPLICATION FILED JUNE 25, 1919.
1,355,790.  Patented Oct. 12, 1920.
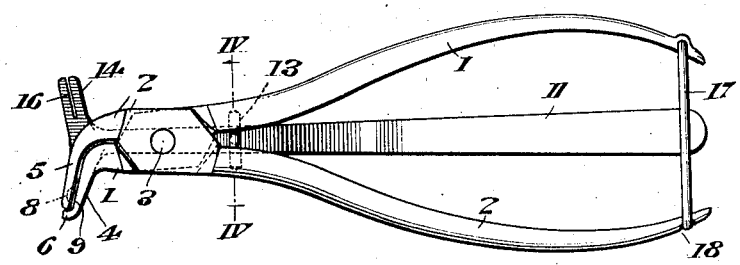
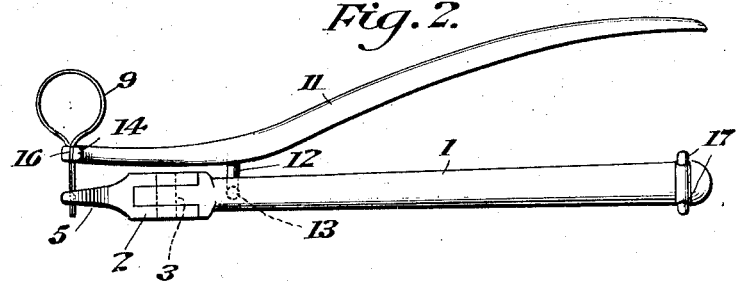
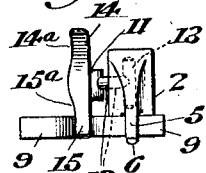
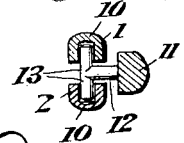
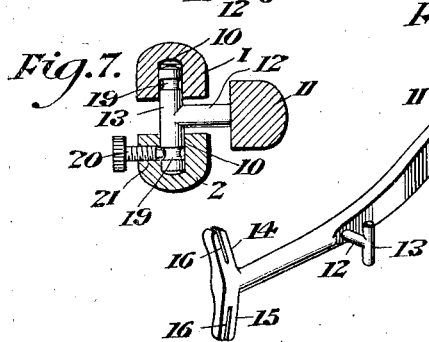
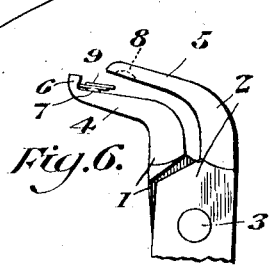
Inventor
Jacob Lowe Young
By his Attorneys

UNITED STATES PATENT OFFICE.

JACOB LOWE YOUNG, OF NEW ROCHELLE, NEW YORK.

DENTAL APPLIANCE.

1,355,790.  Specification of Letters Patent.  Patented Oct. 12, 1920.

Application filed June 25, 1919. Serial No. 306,681.

*To all whom it may concern:*

Be it known that I, JACOB LOWE YOUNG, a citizen of the United States, and resident of New Rochelle, county of Westchester, and State of New York, have invented certain new and useful Improvements in Dental Appliances, of which the following is a specification.

This invention relates to appliances for use in shaping band material about a tooth, or for measuring a tooth to ascertain the size of band required to embrace the tooth.

The invention has for one of its objects the provision of means for causing a strip of material to closely embrace a tooth.

Another object of the invention is to provide means whereby a strip of material may be expeditiously passed about a tooth and drawn tightly around the same to ascertain the size of tooth band required to embrace the tooth.

Another object of the invention is to provide an appliance having a pair of jaws adapted to grip the adjacent ends of a doubled strip of material and a member shiftable relatively to the jaws for contracting the loop formed by the doubled piece of material held by the jaws.

A further important object of the invention is to provide a dental appliance of the pliers type having a third handle pivotally connected therewith and shiftable in a plane transversely of the plane of movement of the handles of the pliers, said third handle carrying means adapted to contract the loop formed by a doubled strip of material held by the jaws of the pliers.

A further important object of the invention is to provide a reversible and removable band-material-manipulating attachment for dental pliers.

Another object of the invention is to provide a band-material holding and manipulating appliance so constructed that it may be readily adjusted to adapt it to shape band material about either upper or lower teeth at any position in the dental arch.

In the drawings:

Figure 1 is a side elevation of one form of appliance embodying the invention;

Fig. 2 a plan view thereof;

Fig. 3 an end elevation;

Fig. 4 transverse section on the line IV—IV of Fig. 1;

Fig. 5 a perspective view of the band-material manipulating member;

Fig. 6 an enlarged detail view showing the plier jaws open and the ends of the band material in place between the jaws; and Fig. 7 a view similar to Fig. 4 showing a slightly modified form of connection between the pliers and band-material manipulating member.

Referring to the drawings by numerals, 1 and 2 designate the pivoted lever members of the pliers. The members 1 and 2 are pivotally connected in crossed relation adjacent one end thereof by a pivot pin 3, the longer arms of the lever members being bowed to form handles and the shorter arms thereof being bent laterally at an angle to the pivotal axis of the members to form coöperating offset gripping jaws 4 and 5 closely adjacent the pivotal point of the lever members. The jaw 4 is formed with a stop, lug or projection 6 at its outer end adapted to be engaged by the outer end of the jaw 5 when the jaws are shifted into gripping relation and is also provided with a gripping stud or projection 7 on the gripping face thereof a short distance from said stop lug. The jaw 5 is formed with a recess 8 in the gripping face thereof a short distance from its outer end, which is adapted to receive the stud 7 on jaw 4 when the jaws are shifted into gripping relation.

At the opposite side of the pivot pin 3 from the jaws the lever members are each formed with a socket 10 in the adjacent inner sides thereof.

A detachable and reversible tooth-band material manipulating member 11 is adapted to be pivotally held at either side of the pliers. The member 11 is provided with a laterally projecting lug 12 adjacent one end carrying a pivot pin 13 the opposite ends of which are adapted to seat in the sockets 10 on the members 1 and 2 to pivotally connect the member 11 with the pliers to swing about a pivot at a right angle to the pivot pin 3. The longer arm of the member 11 is bowed to form a handle and the shorter arm thereof is provided with oppositely extending portions 14 and 15 forming a substantially T-shaped head. The head portions 14 and 15 are each provided with a transverse slot 16 extending inwardly from the outer end thereof. The slot in one head portion is in alinement with the gripping faces of the jaws of the pliers when the member 11 is supported at one side of the pliers, and the slot in the other head portion is in alinement with the gripping faces of the jaws when the member 11 is supported at the opposite side of the pliers. One side of each of the head portions 14 and 15 is shaped to conform with a tooth as shown at 14$^a$ and 15$^a$.

A locking bail 17 is pivotally held to the handle of the member 1 and is adapted to be shifted to embrace the handle of the member 2 and engage in a notch 18 therein to hold the jaws of the pliers in gripped relation and to maintain the pivot pin 13 of member 11 in the sockets 10. The pivot pin 13 is sufficiently long and the sockets 10 are sufficiently deep to permit enough movement of the members 1 and 2 to cause jaws 4 and 5 to grip and release the band material 9 without disconnecting member 11 from the members 1 and 2.

The operation of the appliance is as follows: The member 11 is arranged at the proper side of the pliers, according to the location of the tooth to be fitted with a band, and the handles of the pliers pressed toward each other until the ends of pivot pin 13 of member 11 engage in the sockets 10. A strip of flexible metal 9 is doubled and engaged in the slot 16 of that head portion of member 11 which is in alinement with the gripping jaws of the pliers, and the ends of said strip 9 are inserted between the jaws of the pliers and the pliers operated to firmly grip the ends of the strip. The jaw 5 as it approaches jaw 4 will force the edges of the strip against stop 6 on jaw 4 and said jaws will tightly grip the registering end portions of the strip, the lug 7 indenting the strip of band material into recess 8. The handles of the pliers are then locked by bail 17 and the appliance is inserted in the mouth and the looped portion of the band material 9 engaged around the desired tooth. The handle portion of member 11 is then pressed inwardly toward the pliers, thus rocking the head portion away from the gripping jaws to contract the looped portion of the band material until it tightly embraces the tooth. By providing several of the detachable members 11 and shaping the outer sides of the head portions 14 and 15 thereof to conform with the surfaces of different classes or types of teeth, the appliance is adapted to shape strips of band material accurately about different teeth. The appliance may be used to fit strips of gold or other band material directly about teeth, or may be used with a flexible strip of brass or other suitable material to measure teeth to ascertain the size of band required therefor. The appliance is adapted to draw the metal strip tightly about the tooth and will form permanent bends, creases, or indentations in the strip at the points where the outer face of the head portion of member 11 bears against the side of the tooth.

The jaws of the pliers and the head of member 11 are so shaped as to readily adapt the appliance for use either at the inner or outer side of either the upper or lower dental arch, and the plier members are so constructed that a slight movement of the handles of the pliers will cause the jaws thereof to grip or release a strip of band material.

In the modified construction illustrated in Fig. 7, means is shown for positively but detachably securing the material manipulating member 11 to the pliers to prevent accidental separation thereof in handling the appliance. For this purpose the pivot pin 13 carried by member 11 is provided with circumferential grooves 19 adjacent the opposite ends thereof and a locking screw 20 is threaded through an aperture 21 in the member 2 of the pliers leading into the adjacent socket 10. It will be obvious that the member 11 may thus be positively locked to the pliers, while positioned at either side thereof, by threading the screw 20 inwardly until the inner end thereof projects into the groove 19 in whichever end of pivot pin 13 is seated in socket 10 in member 2. The groove 19 permits the member 11 to be rocked freely about its pivot when the screw 20 is in locking position. It will be obvious that various other means may be provided for positively but detachably securing the member 11 to the pliers.

What I claim is:

1. A dental appliance comprising a pair of crossed handle members provided with gripping jaws at one end and pivotally connected together intermediate their ends, an auxiliary handle member having a slot adjacent one end adapted to receive a doubled strip of material held by the gripping jaws, and means for pivotally and detachably connecting the auxiliary handle member intermediate its ends with the crossed handle members to swing in a plane transversely of the plane of movement of the crossed members for varying the size of the loop formed by a doubled strip of material held by the gripping jaws.

2. A dental appliance comprising a pair of crossed pivotally connected lever members having coöperating gripping jaws at one end, a third lever member extending along one side of the crossed lever members, and means pivotally connecting the third lever member to one of the crossed lever members to swing about an axis extending transversely of the pivotal axis of the crossed members, one end of said third lever member being movable toward and from one side of the gripping jaws on the crossed members and having an opening therethrough adapted to receive a doubled strip of material gripped by said jaws.

3. The combination of a pair of pliers having jaws adapted to grip the ends of a doubled strip of material, a lever having a handle portion and a head portion provided with a slot extending therethrough in the direction of movement thereof adapted to receive a doubled strip of material held by the pliers, and means for pivotally connecting said lever intermediate its ends with the pliers to swing toward and from one edge of the jaws of the pliers for varying the size of the loop formed by the doubled strip of material held by the pliers.

4. A dental appliance comprising a pair of pliers having crossed pivotally connected members provided with laterally offset gripping jaws at one end, a tooth-band-material contracting member having a handle portion and a laterally offset head portion provided with an opening through which a doubled strip of tooth-band-material gripped by the jaws of the pliers is adapted to extend, and means pivotally connecting said material contracting member intermediate its ends with the pliers to permit movement of the head portion thereof toward and from one side of the jaws of the pliers.

5. A dental appliance comprising a pair of pliers provided with coöperating offset gripping jaws, a reversible member having two strip-embracing portions through either of which a doubled strip of material held by the jaws may pass, and means for shiftably and detachably supporting said member on the pliers with said strip-embracing portions at one side or the other of the jaws and one of said embracing portions in position to receive a doubled strip of material gripped by the offset jaws of the pliers and contract the loop formed by said strip when the member is shifted in one direction.

6. A dental appliance comprising a pair of crossed pivotally connected handle members provided at one end with coöperating offset gripping jaws and formed with oppositely disposed sockets at the opposite side of their pivot point from the jaws, and a detachable and reversible auxiliary handle member provided intermediate its ends with a pivot pin adapted to engage in the sockets in the crossed handle members, said auxiliary member being also provided with a head having oppositely extending portions parallel with the gripping jaws each of which is formed with a slot adapted to receive material gripped by the jaws in one position of the reversible auxiliary handle member.

7. A dental appliance comprising a pair of crossed pivotally connected handle members provided at one end with coöperating offset gripping jaws and formed with oppositely disposed sockets at the opposite side of their pivot point from the jaws, and a detachable and reversible auxiliary handle member provided intermediate its ends with a laterally offset pivot pin adapted to engage in the sockets in the crossed handle members, said auxiliary member being also provided with a head having oppositely extending portions parallel with the gripping jaws each of which is formed with a slot adapted to receive a doubled strip of material gripped by the jaws in one position of the reversible auxiliary handle member, said slotted portions of the auxiliary member having concave outer tooth-engaging faces and means for locking the crossed handle members together to hold the jaws thereon in gripping relation with each other.

8. A reversible tooth-band-material manipulating attachment for dental pliers comprising a lever having means held thereto intermediate its ends for detachably and pivotally supporting the lever on the pliers to swing about an axis at a right angle to the pivot of the members of the pliers, said lever having a handle portion at one side of its fulcrum and a head portion at the opposite side of its fulcrum, the head portion having two transverse slots extending inwardly from opposite edges thereof.

9. A reversible tooth band material manipulating attachment for dental pliers comprising a lever having means held thereto intermediate its ends for detachably and pivotally supporting the lever on the pliers to swing about an axis at a right angle to the pivot of the members of the pliers, said lever having two oppositely disposed laterally projecting portions at one side of its fulcrum each of which is provided with a transverse slot, one side of each of said projecting portions being shaped to conform with a tooth surface.

10. A dental appliance comprising a pair of crossed pivotally connected lever members provided at one end with coöperating offset gripping jaws and formed with oppositely disposed sockets at the opposite side of their pivotal point from the jaws, a detachable and reversible auxiliary lever member, a pivot pin held to said auxiliary lever member intermediate the ends of said member adapted to engage in the sockets in the other lever members and formed with circumferential grooves adjacent opposite ends thereof, a locking screw threaded into one of the crossed lever members the inner end of which is adapted to project into one of the grooves in the pivot pin in either position of the reversible lever member, and a pair of oppositely extending arms formed on the reversible lever member each of which is provided with a slot adapted to receive material gripped by the jaws in one position of the reversible member.

11. A dental appliance comprising a pair of pivotally connected plier members having coöperating gripping jaws, a lever extending along one side of the plier members, a pivot pin held to said lever intermediate the ends of the lever and having a circumferential groove therein, one of said plier members being provided with a socket adapted to receive said pivot pin, and a locking screw threaded in the plier member provided with the socket and adapted to engage in the groove in the pivot pin, said lever having an opening therethrough at a point opposite the jaw of the plier member to which the lever is held.

This specification signed this twenty-third day of June, A. D. 1919.

JACOB LOWE YOUNG.